United States Patent
Kritt et al.

(10) Patent No.: US 9,513,713 B2
(45) Date of Patent: Dec. 6, 2016

(54) FINE CONTROL OF MEDIA PRESENTATION PROGRESS

(71) Applicant: LENOVO ENTERPRISE SOLUTIONS (SINGAPORE) PTE. LTD., New Tech Park (SG)

(72) Inventors: Barry A. Kritt, Atlantic Beach, NC (US); Sarbajit K. Rakshit, Kolkata (IN)

(73) Assignee: LENOVO ENTERPRISE SOLUTIONS (SINGAPORE) PTE. LTD. (SG)

(*) Notice: Subject to any disclaimer, the term of this patent is extended or adjusted under 35 U.S.C. 154(b) by 99 days.

(21) Appl. No.: 14/308,010

(22) Filed: Jun. 18, 2014

(65) Prior Publication Data
US 2015/0373299 A1    Dec. 24, 2015

(51) Int. Cl.
| | | |
|---|---|---|
| H04N 5/783 | (2006.01) |
| G06F 3/048 | (2013.01) |
| G06F 3/01 | (2006.01) |
| G11B 27/10 | (2006.01) |
| G11B 27/00 | (2006.01) |
| G11B 27/34 | (2006.01) |
| G06F 3/0488 | (2013.01) |
| G06F 3/0485 | (2013.01) |

(52) U.S. Cl.
CPC .............. *G06F 3/017* (2013.01); *G06F 3/0485* (2013.01); *G06F 3/0488* (2013.01); *G11B 27/005* (2013.01); *G11B 27/105* (2013.01); *G11B 27/34* (2013.01); *H04N 5/783* (2013.01)

(58) Field of Classification Search
CPC .......... H04N 5/783; G06F 3/041; G06F 3/048; G06F 3/0482; G06F 3/0481
USPC .......................................... 386/344; 715/779
See application file for complete search history.

(56) References Cited

U.S. PATENT DOCUMENTS

| | | | |
|---|---|---|---|
| 8,566,719 B2* | 10/2013 | Toh ...................... | G06F 3/04847 715/716 |
| 2011/0145745 A1 | 6/2011 | Hyeon et al. | |
| 2013/0324192 A1 | 12/2013 | Lee et al. | |
| 2014/0033111 A1* | 1/2014 | Yoo ........................ | G06F 3/0482 715/779 |

OTHER PUBLICATIONS

Disclosed Anonymously, Method to Control Video Playback Time Progress in Mobile Device II, IP.com, IPCOM000229553D, Aug. 6, 2013.

* cited by examiner

*Primary Examiner* — Thai Tran
*Assistant Examiner* — Syed Hasan
(74) *Attorney, Agent, or Firm* — Kunzler Law Group; Katherine Brown

(57) ABSTRACT

In a touch-based device presenting a media content playback, a first increment of a first control is determined. The first control allows a user to move forward or back in the media content in steps of the first increment using a touch-based gesture. A second increment and a size of a second control is computed using the first increment and a factor. The second increment is smaller than the first increment. The second control is constructed and presented according to the second increment and the size of the second control, the second control allowing the user to move forward or back in the media content in steps of the second increment. Responsive to the user using the second control, a forward or back movement in the media content by a multiple of the second increment is performed.

20 Claims, 11 Drawing Sheets

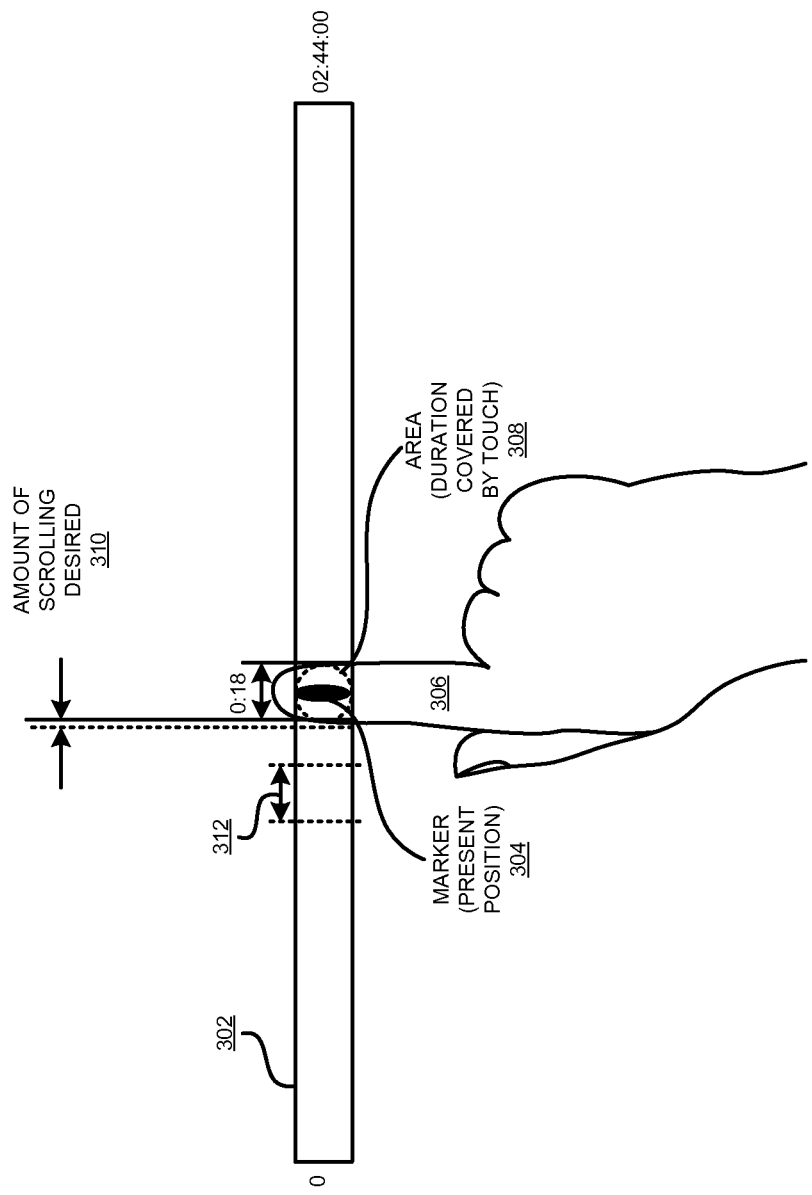

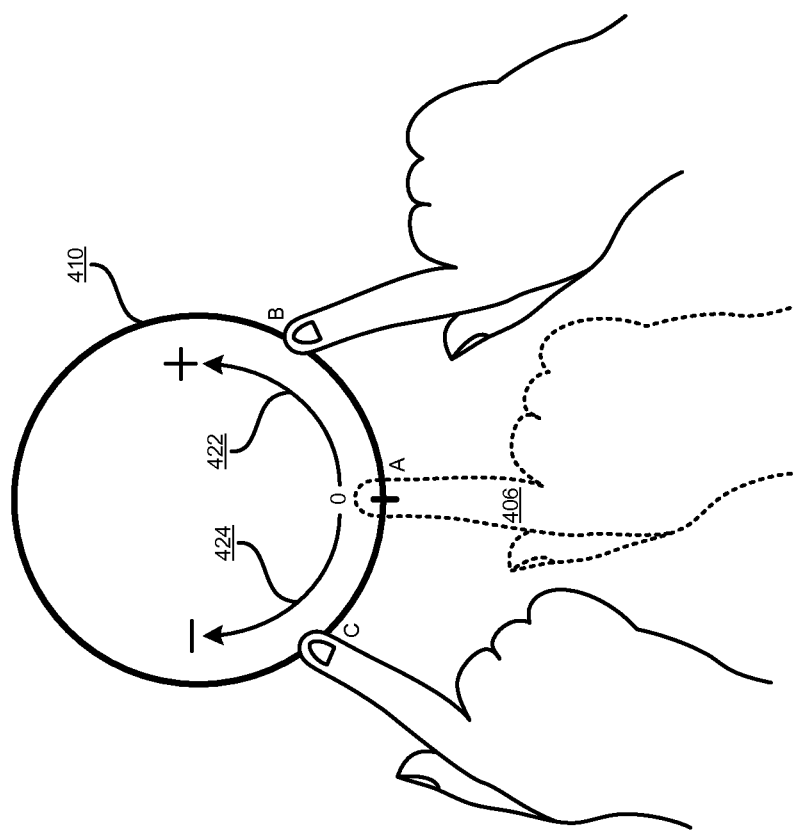

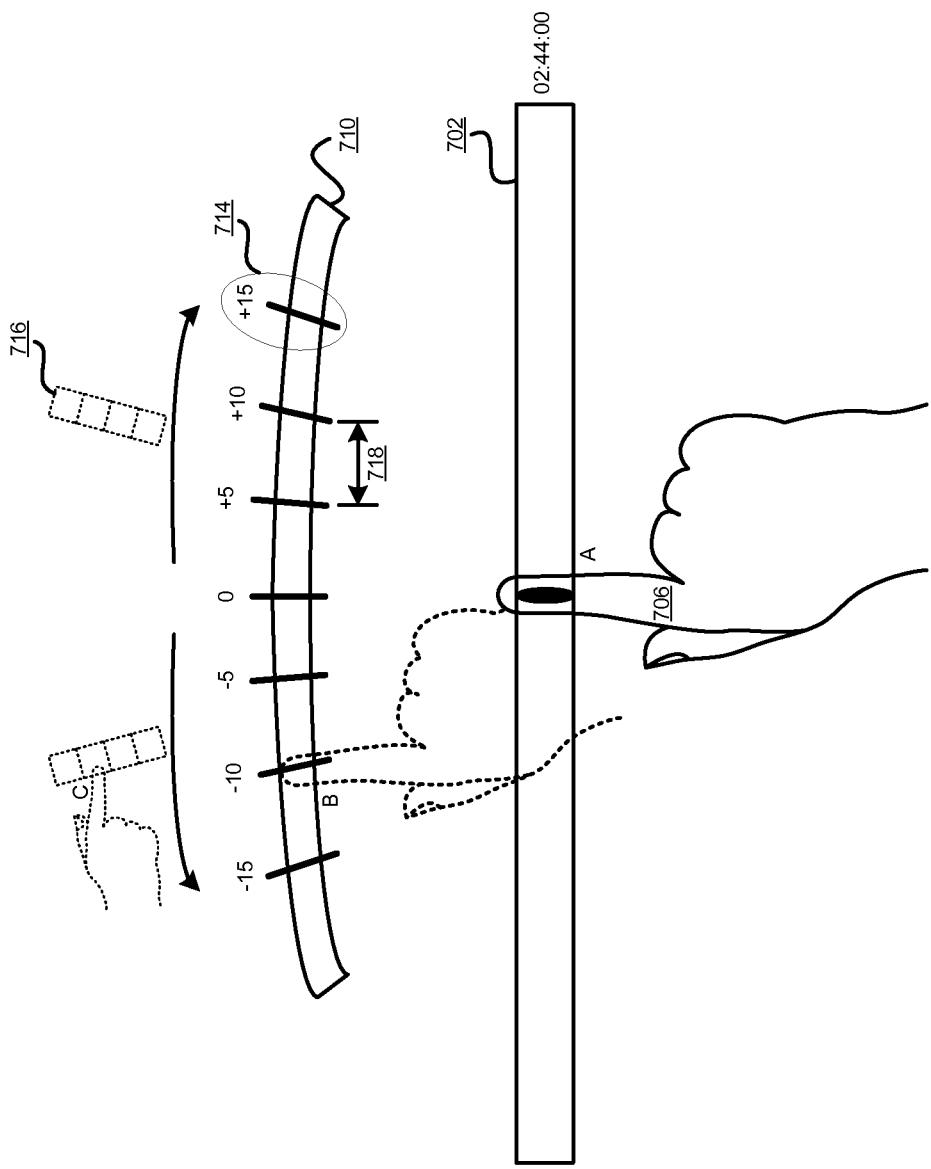

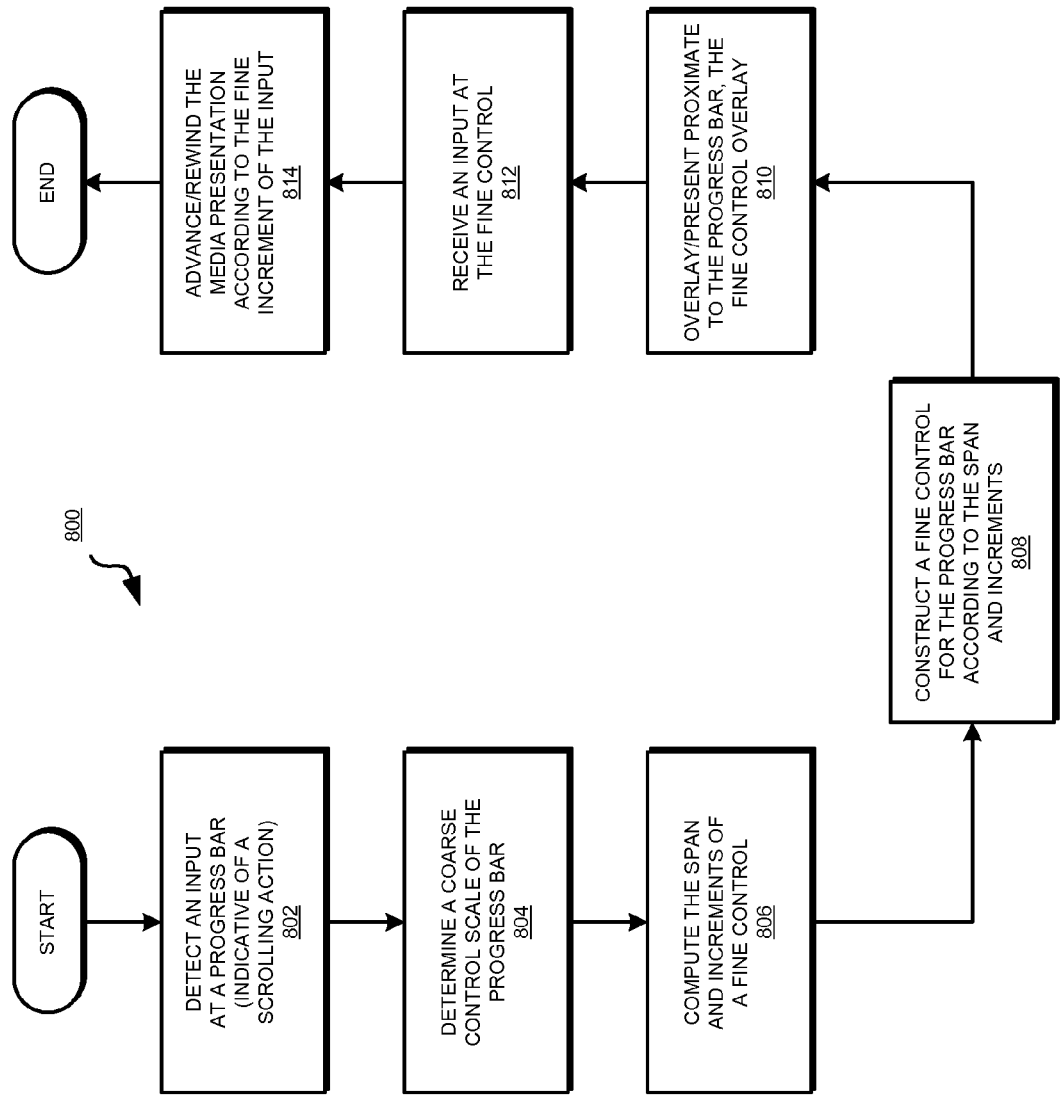

FINE CONTROL OF MEDIA PRESENTATION PROGRESS

TECHNICAL FIELD

The present invention relates generally to a method, system, and computer program product for scrolling a media presentation. More particularly, the present invention relates to a method, system, and computer program product for fine control of media presentation progress using touch-based gestures.

BACKGROUND

Many modern devices allow a user to touch a screen as a way of providing a user-input. A touch-based input or a touch-based gesture is a manner of providing a user input by touching a touch-sensitive device. Some touch-based gestures are a single point tap or touch, e.g., with a single finger or stylus. Other touch-based gestures are more complex, e.g., a swiping motion with a finger or stylus, tapping with more than one fingers or styli, or drawing patterns on the device with one or more fingers or styli.

Any device capable of accepting a touch-based input is referred to herein as a touch-based device. A computer monitor, a smartphone display screen, and a screen of a tablet computing device are all examples touch-based devices employing touch-sensitive screens. A touch-sensitive screen allows a user to touch the screen at different locations, in different manners, or a combination thereof, to provide touch-based inputs.

An application executing on the touch-based device accepts the inputs to perform certain operations. Often, the application presents a graphical display on the touch-sensitive screen to guide the user in performing the touch-based gesture.

For example, an application may present the well-known "OK" and "Cancel" operations as button graphics on the graphical user interface (GUI) of a touch-based device. The user taps or touches one of those button graphics to indicate the user's selection to the application. The application accepts the touch as a user-input, determines the location and/or the manner of the touch, correlates the location with a location of one of the button graphics, and performs the action corresponding to that button graphic which matches the location of the touch.

Media presentation on touch-based devices is now commonplace. For example, users often play audio media and video content on a variety of touch-based devices such as smartphones, mobile media player devices, tablet computing devices, laptop computers with touch-sensitive screens, and many others. Many applications that are used to perform the playback of the audio or video content allow the user to advance or rewind the content to a particular point in the playback timeline.

SUMMARY

The illustrative embodiments provide a method, system, and computer program product for fine control of media presentation progress. An embodiment includes a method for controlling media content playback. The embodiment determines, in a touch-based device presenting the media content playback, a first increment of a first control, the first control allows a user to move forward or back in the media content in steps of the first increment using a touch-based gesture. The embodiment computes using the first increment and a factor, a second increment and a size of a second control, wherein the second increment is smaller than the first increment. The embodiment constructs the second control according to the second increment and the size of the second control, the second control allowing the user to move forward or back in the media content in steps of the second increment. The embodiment presents on the media content playback, the second control. The embodiment moves, responsive to the user using the second control, one of (i) forward and (ii) back in the media content by a multiple of the second increment.

Another embodiment includes a computer usable program product comprising a computer readable storage device including computer usable code for controlling media content playback. The embodiment further includes computer usable code for determining, in a touch-based device presenting the media content playback, a first increment of a first control, the first control allows a user to move forward or back in the media content in steps of the first increment using a touch-based gesture. The embodiment further includes computer usable code for computing using the first increment and a factor, a second increment and a size of a second control, wherein the second increment is smaller than the first increment. The embodiment further includes computer usable code for constructing the second control according to the second increment and the size of the second control, the second control allowing the user to move forward or back in the media content in steps of the second increment. The embodiment further includes computer usable code for presenting on the media content playback, the second control. The embodiment further includes computer usable code for moving, responsive to the user using the second control, one of (i) forward and (ii) back in the media content by a multiple of the second increment.

Another embodiment includes a data processing system for controlling media content playback. The embodiment further includes a storage device including a storage medium, wherein the storage device stores computer usable program code. The embodiment further includes a processor, wherein the processor executes the computer usable program code. The embodiment further includes computer usable code for determining, in a touch-based device presenting the media content playback, a first increment of a first control, the first control allows a user to move forward or back in the media content in steps of the first increment using a touch-based gesture. The embodiment further includes computer usable code for computing using the first increment and a factor, a second increment and a size of a second control, wherein the second increment is smaller than the first increment. The embodiment further includes computer usable code for constructing the second control according to the second increment and the size of the second control, the second control allowing the user to move forward or back in the media content in steps of the second increment. The embodiment further includes computer usable code for presenting on the media content playback, the second control. The embodiment further includes computer usable code for moving, responsive to the user using the second control, one of (i) forward and (ii) back in the media content by a multiple of the second increment.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a block diagram of an example coarse control that can be improved in accordance with an illustrative embodiment;

FIG. 4B depicts a block diagram of an example fine control of media presentation progress in accordance with an illustrative embodiment;

FIG. 7A depicts a block diagram of another example fine control of media presentation progress in accordance with an illustrative embodiment;

FIG. 8 depicts a flowchart of an example process for fine control of media presentation progress in accordance with an illustrative embodiment.

DETAILED DESCRIPTION

Figure 1:
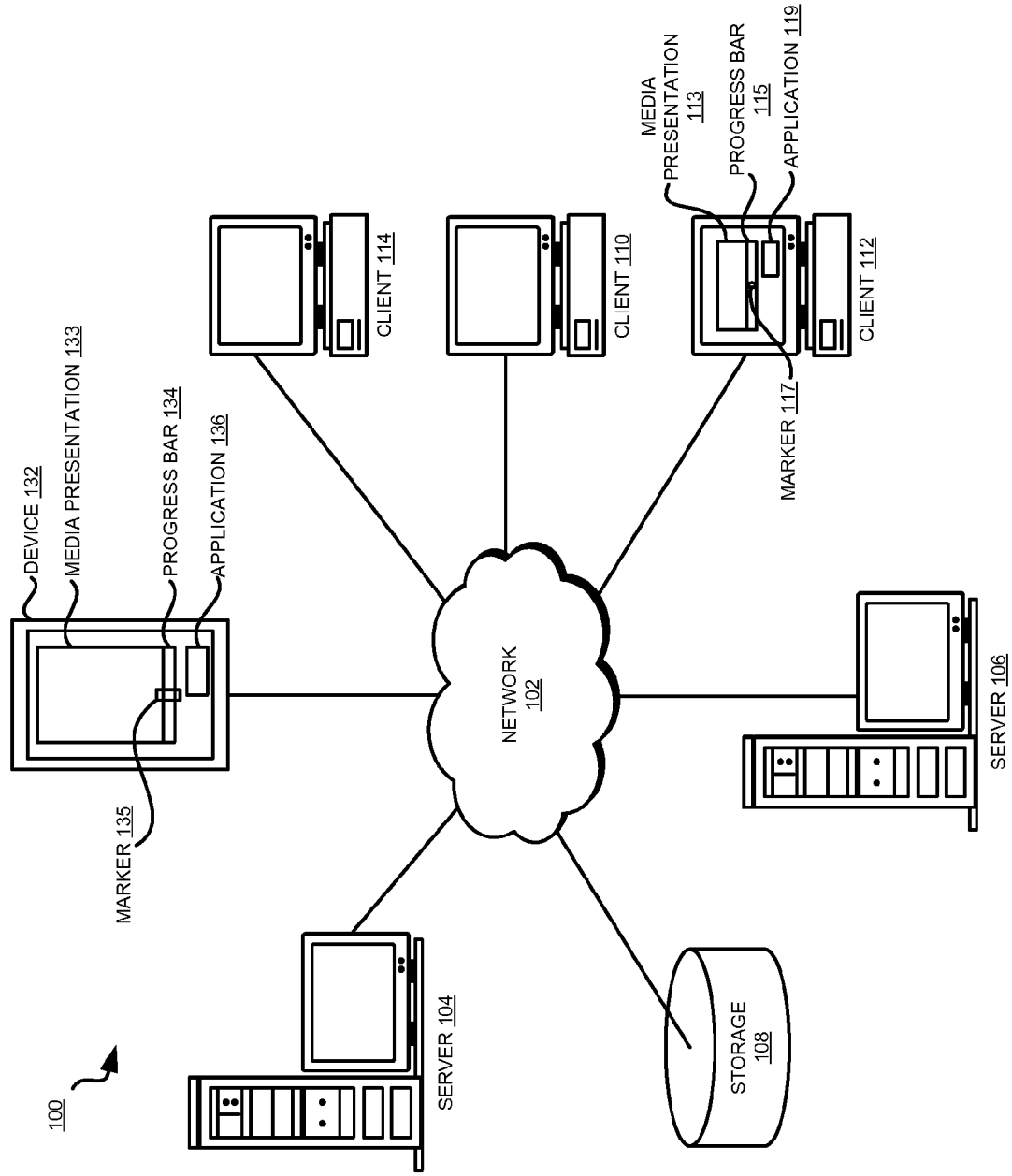
FIG. 1 depicts a block diagram of a network of data processing systems in which illustrative embodiments may be implemented.

Within the scope of the illustrative embodiments, media presentation comprises playback of any type of media content, such as audio content from an audio file or source, video content from a video file or source, and audio-visual content from a corresponding file or source. A media presentation application within the scope of the illustrative embodiments is any software or combination of hardware and software that performs a media presentation.

Media presentation applications often employ a graphical user interface (GUI). The media presentation applications use the GUI not only to present some aspect of the media content, but also to provide additional media playback relevant information to the user, and accept user inputs via touch-based inputs or gestures.

A progress bar is a scrollable graphical artifact on a media presentation application's GUI, and represents a playback timeline of the media presentation. For example, a music player application presents a progress bar with a moving marker, where the marker is updated or repositioned to indicate the elapsed playback time from the beginning of the playback of a music file as the content of the music file is played back. Video presentation applications also include similar progress bars and markers to inform the user of the elapsed time since the beginning of the video playback, remaining time to the end of the playback, or both.

Many media presentation applications allow a user to manually reposition the marker on the progress bar. Where the current position of the marker on the progress bar is representative of the present portion of the media content being presented, moving the marker to a position in the elapsed portion of the timeline (usually to the left of the present position) indicates the user's desire to rewind or return to a previously presented portion of the content, and review or resume playback of the content from that position. An operation that rewinds or returns a playback to a previously presented position on the elapsed timeline section of the progress bar is hereinafter referred to as a "scroll back" operation, or a grammatical variation thereof.

Similarly, moving the marker to a position in the remaining portion of the timeline (usually to the right of the present position) indicates the user's desire to advance or fast-forward to an as-yet-unpresented portion of the content and resume playback of the content from that position. An operation that advances or fast-forwards a playback to an as-yet-unpresented position on the remaining timeline section of the progress bar is hereinafter referred to as a "scroll forward" or "scroll ahead" operation, or a grammatical variation thereof.

The illustrative embodiments recognize that presently, a progress bar allows scrolling back or scrolling forward in time increments that are unsuitable for reaching a content portion with accuracy or precision. For example, some presently used progress bars use scrolling increments that are proportional to the total time of the playback. For example, if the total playback time is two hours, each scroll back (or scroll forward) increment goes back (or forward) six minutes. Some other progress bars allow users to select from thumbnails collected from discrete points in the content, and the user is forced to select from those thumbnails and scroll back (or forward) to the location of that thumbnail in the content.

The illustrative embodiments recognize that often, a user desires to scroll back or forward in much smaller increments. For example, a user watching a movie may miss a dialogue, and may want to scroll back just enough, perhaps, five seconds, to review that dialogue and proceed from that point in the content.

Thus, illustrative embodiments recognize that some a presently used progress bars accept touch-based inputs are configured with fixed coarse increments and do not respond with scrolling in smaller or finer increments. The illustrative embodiments further recognize that even if smooth scrolling to any position on the progress bar were possible, small movements of the marker would be needed to scroll in small or fine increments, and the area of the touch in the touch-based input is larger than the scrolling movement. Consequently, the marker becomes hidden under the finger or stylus used for the touch, and exceptional dexterity is required from the user to move the finger or stylus ever so slightly (while the marker remains hidden), to cause fine scroll back (or scroll forward).

Thus, the illustrative embodiments recognize that fluid scrolling, scrolling in fine increments, scrolling in increments dynamically computed fine increments that are smaller than a coarse total timeline-based increment is either not possible with presently available progress bars or requires dexterity not possible for many users. Thus, the illustrative embodiments recognize that an improved progress bar with additional dynamically computed graphical artifacts to facilitate fine scrolling would be desirable.

The illustrative embodiments used to describe the invention generally address and solve the above-described problems and other problems related to scrolling media presentations using touch-based gestures with a progress bar. The illustrative embodiments provide a method, system, and computer program product for fine control of media presentation progress.

A fine increment within the scope of the illustrative embodiments is a scrolling increment that allows scrolling (back or forward) of the content in increments smaller than an increment possible from the progress bar alone. The smallest increment possible on a prior-art progress bar is called a coarse increment. A fine increment is smaller than the coarse increment within the scope of the illustrative embodiments.

An example fine increment according to one embodiment is an increment that corresponds to movements or changes in touch-based gestures that are smaller than the size of the area of the touch. For example, a movement of one-eighth or one-sixteenth inch using a half inch wide finger on a two-inch wide progress bar is such a movement and corresponds to a fine increment. As another example, a movement to cause a scroll back of the order of seconds on a four inches long progress bar corresponding to a timeline of several minutes to hours, e.g., scrolling back five seconds in a two hour-long timeline, is such a movement and corresponds to a fine increment.

Furthermore, a fixed coarse increment for scrolling on a progress bar is pre-determined based on the total playback time of the content. The fixed coarse increments can be inherent in the progress bar, where a movement distance of a scrolling touch-based gesture is rounded up to the next higher fixed coarse increment. The fixed coarse increments can be visible, such as in the form of a series of thumbnails or markings on the progress bar, to guide a user's touch-based gesture movement for scrolling from the position corresponding to one thumbnail or marking to the next.

A dynamic fine increment is a scrolling interval computed based on factors other than or in addition to the playback time of the content. For example, one example manner of dynamically computing a fine increment takes into account the width of, or the area covered by, the particular user's finger or stylus when the user makes a touch-based input or gesture. Another example manner of dynamically computing a fine increment takes into account the display area on the screen available to present additional scrolling artifacts to facilitate fine scrolling according to an embodiment. Another example manner of dynamically computing a fine increment takes into account the size of an additional scrolling artifact to facilitate fine scrolling according to an embodiment, and computes the increment based on that size.

An embodiment detects a touch-based gesture at a progress bar during a media presentation. The embodiment measures certain factors to dynamically determine a fine scrolling interval. The embodiment selects a graphical artifact to present a fine scrolling mechanism to the user, whereby the user is enabled to perform scrolling of the content in increments smaller than an increment possible from the progress bar alone. Such graphical artifact for facilitating fine scrolling is called a fine control. The prior art progress bar by comparison becomes a coarse control.

The fine control presents a scrolling ability to a user such that the user can make larger movements for scrolling in fine increments as compared to the size of the movements that would be required on the coarse control even if smooth scrolling to any position in the content were possible by the coarse control. The embodiment receives a touch-based input at the fine control. The embodiment causes a scroll back or scroll forward to occur in the media presentation corresponding to the fine increment selected by the touch-based input at the fine control.

For example, assume a coarse control as a linear progress bar with evenly distributed coarse increments. Assume that the coarse control is four inches long, represents a timeline of two hours, and each coarse increment allows the user to scroll back or forward six minutes. Assume that at a given time, the marker is positioned at approximately one hour and thirty minutes elapsed playback time.

The user wants to scroll back ten seconds and places a finger on the marker. An embodiment detects the touch of the finger as a touch-based input. The embodiment measures the width of the finger and finds that the finger covers three increments, to wit, eighteen minutes of content. The embodiment presents a second progress bar that is dynamically sized according to the width of the finger to scroll within a fraction of a coarse interval of six minutes.

The second progress bar—the fine control—can be of the same or different graphical form as the coarse control—the original progress bar. For example, if the coarse control is a linear shape scroll bar, the fine control can also be a linear shape scroll bar with a different resolution or increments. In some embodiments, the second progress bar is of a different shape, size, or proportion as compared to the original progress bar. For example, in one embodiment, the second progress bar is a circular or arc-type scale that is three inches wide and distributes one minute of total interval over the three inches.

In another embodiment, the second progress bar is a circular scale of a circumference (C) of five inches, allowing a half-inch wide finger (W) at least ten (C/W) non-overlapping positions to occupy around the circumference, each such position being a fine increment. In another embodiment, the ten non-overlapping positions representing ten fine increments uniformly divide a content span (S) equal to fraction of a coarse increment, e.g. 1 minute, each fine increment being 0.1 minute or six second wide (S/C/W), much smaller than the six minute coarse increment. In another embodiment, the ten non-overlapping positions representing ten fine increments uniformly divide the eighteen minutes span (S) of three coarse increments covered by the finger width (W), each fine increment being 1.8 minutes wide (S/C/W), still much smaller than the six minute coarse increments. In another embodiment, the number of fine increments is determined by (L/S) to uniformly divide a span (S) of a fraction or more of coarse increments over a given length or size (L) of the fine control.

Now, to scroll back ten seconds using the second progress bar the user need not make as small a movement as would be necessary even if the coarse control—four inches and two hours long progress bar—allowed. The second progress bar—the fine control according to an embodiment—allows the user to make a much larger movement, which is comparatively much more comfortable, easier to make, and requires less dexterity than the small movement on the coarse control.

Another embodiment further provides a two-step fine control. The embodiment presents a first fine control using fine increments that are dynamically computed as described elsewhere in this disclosure. The embodiment further identifies sub increments within the fine increment that can be selected by a touch based gesture. For example, assume that the first fine control is the three inch wide arc that distributes a one-minute time interval of content in six equal increments. Thus each fine increment spans ten seconds of content.

An embodiment then extracts a set of representative content from each ten second fine interval covered by the fine control. Assume that for each ten second period of video content covered by a fine interval, the embodiment extracts five thumbnails. Adjacent to a fine interval marking on the first fine control, the embodiment presents the five thumbnails as a second fine control. Now, each thumbnail allows the user scrolling access to the content with two-second finer granularity, as opposed to the one-minute granularity of the fine interval, or the six-minute granularity of the coarse interval.

The illustrative embodiments are described with respect to certain types of content, media presentations, progress bars, graphical artifacts, shapes, scales, intervals, granularity, touch-based inputs and gestures, movements, sizes, computations, rules, policies, algorithms, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
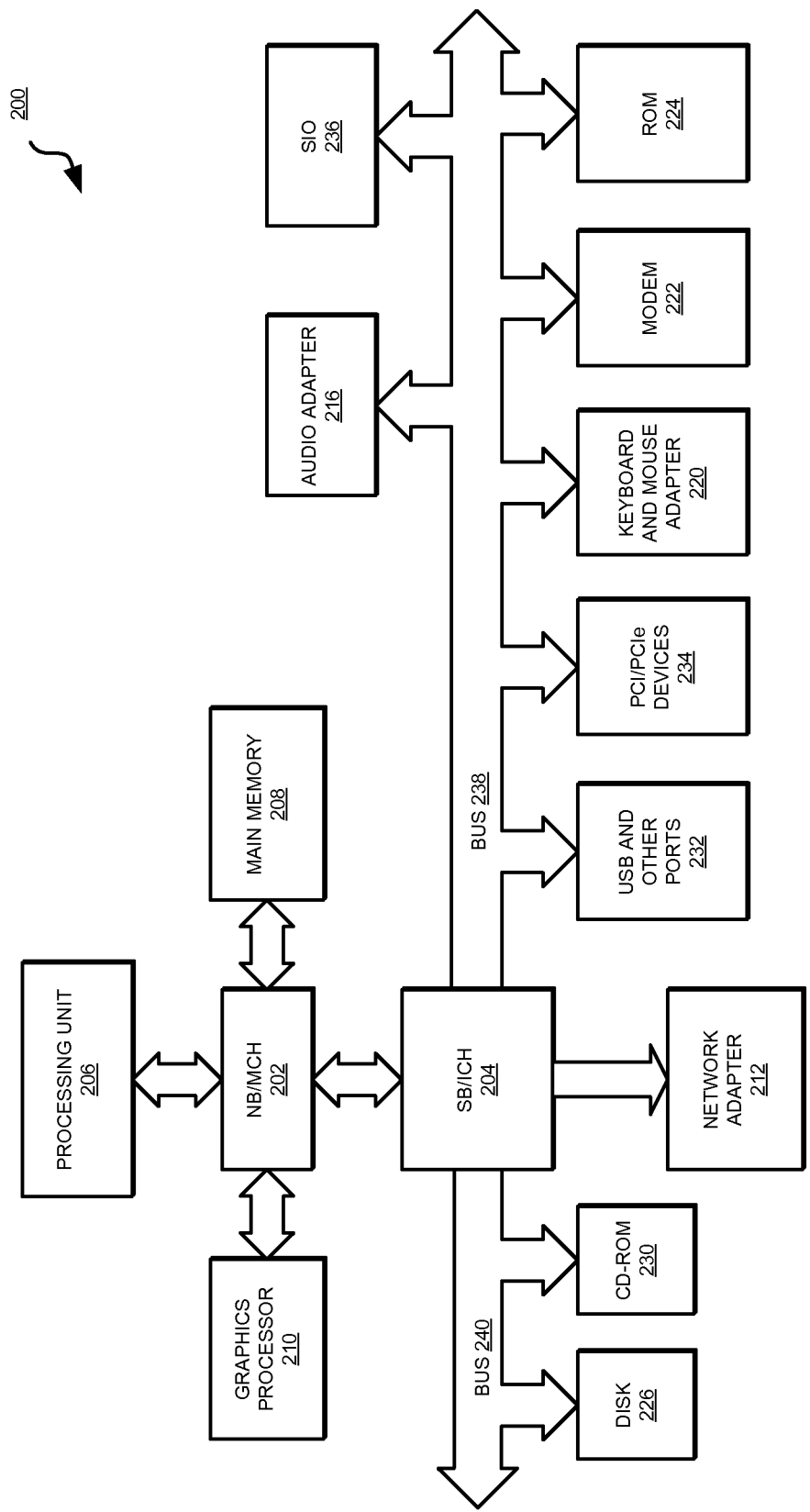
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. Application 136 implements one or more embodiments described herein. Device 132 is a touch-based device, capable of receiving and using touch-based inputs. For example, device 132 executes an application that provides media presentation 133 to playback a suitable media content, progress bar 134 to indicate a progress of the playback along a timeline, and marker 135 to indicate the present position of the playback in that timeline. Application 136 receives a touch-based input, such as a touch from a user's finger or stylus at marker 135 in progress bar 134, and presents a single-stage fine control, or a two-stage fine control according to an embodiment described elsewhere in the disclosure. Media presentation 113 operates in a manner similar to media presentation 133, except on a different device, such as client 112. Progress bar 115 and marker 117 operate in a manner similar to progress bar 134 and marker 135, respectively, but on client 112. Application 119 implements one or more embodiments described herein, and operates in a manner similar to application 136, but on a different device, such as client 112.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of a device, such as device 132 in FIG. 1 in which computer usable program code or instructions implementing the processes of the illustrative embodiments may be located. Data processing system 200 is described as a computer only as an example, without being limited thereto. Implementations in the form of device 132 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 119 or application 136 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

With reference to FIG. 3, this figure depicts a block diagram of an example coarse control that can be improved in accordance with an illustrative embodiment. Coarse control 302 is an example of progress bar 134 in FIG. 1.

Coarse control 302 shows an example playback timeline, which is two hours and forty four minutes long. This example timeline will be used in several subsequent figures and their descriptions to describe various embodiments. Marker 304 is an example of marker 135 in FIG. 1, and marks the present position of playback along the timeline of coarse control 302.

A user performs a touch-based gesture using finger 306 relative to coarse control 302, such as by placing finger 306 at or proximate to marker 304. Area 308 is the area of the touch made by finger 306 on coarse control 302. Area 308 is shown here only to illustrate a duration on the timeline that is covered by the touch. For example, area 308 covers approximately eighteen minutes of the timeline of coarse control 302, and a corresponding amount of content.

Amount 310 is the amount of scrolling back desired by the user. As is evident, only by using coarse control 302, such proportionally small movements as amount 310, as compared to the size of touch area 308, are very difficult to make for many users. Coarse control 302 is also limited by coarse increment size 312, which is the scrolling granularity available from coarse control 302. As is evident, coarse increment 312 is significantly larger than desired scrolling amount 310, and is therefore undesirable.

Figure 4A:
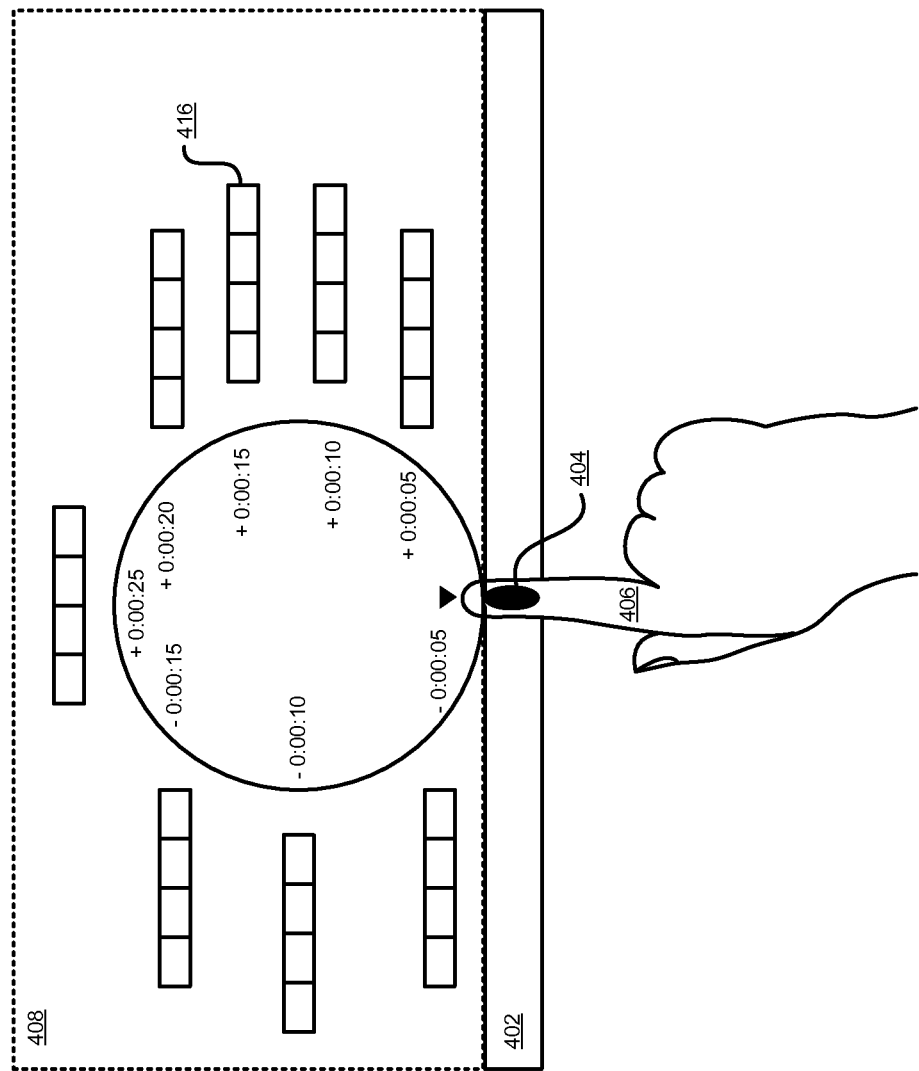
FIG. 4A depicts a block diagram of a fine control in accordance with an illustrative embodiment.

With reference to FIG. 4A, this figure depicts a block diagram of a fine control in accordance with an illustrative embodiment. Coarse control 402 is an example of coarse control 302 in FIG. 3. Marker 404 is an example of marker 304 in FIG. 3. Finger 406 is an example of finger 306 in FIG. 3.

An embodiment, such as an embodiment implemented in application 136 in FIG. 1, detects or receives the touch-based input made by placing finger 406 at any location on coarse control 402, not necessarily only at marker 404. Upon detecting or receiving such touch-based input or another similarly purposed touch-based input, the application computes and presents fine control 408.

In an example embodiment as depicted in this figure, fine control 408 takes the form of a circular graphical artifact. The user is able to slide finger 406 from current position 412 of finger 406 (initial position, position 0) along line or bar 410 of fine control 408 to reposition finger 406 at any of markings 414, or between such markings (target position).

Finger 406 can also be repositioned in any suitable manner, other than sliding along line 410, to any of markings 414 or another position on line 410. For example, finger 406 may be lifted from the initial position and placed on a target position without sliding along line 410. As another example, finger 406 may be slid to cut across the circle formed by line 410 to rest at a target position.

As an example, marking 414 shows that if finger 406 is positioned there on line 410, the user can scroll forward five seconds. Other markings similar to marking 414 on line 410 similarly inform the user that moving in a counter-clockwise direction from position 410, the user can scroll forward ten seconds, fifteen seconds, twenty seconds and twenty five seconds by performing a touch-based gesture using finger 406 at such other markings. Moving in a clockwise direction from position 410, the user can scroll back ten seconds, twenty seconds, and thirty seconds by performing a touch-based gesture using finger 406 at other markings.

Notice that the example embodiment depicted in FIG. 4A provides fine control 408 that is operable to scroll back as well as scroll forward. Further notice that the fine increment granularity of the scroll back operation can be the same as or different from the fine increment granularity of the scroll forward operation. Furthermore, the number of markings 414 for scroll back operation can be, but need not necessarily be, the same as the number of markings 414 for scroll forward operation.

In one embodiment, the application presents only graphical artifacts 410 and 414 in fine control 408. Such a presentation makes fine control 408 a single-stage fine control.

In another embodiment, the application presents additional graphical artifacts. For example, blocks 416 contain further scrollable sub-increments within fine increments between markings 414. For example, fine interval 418 comprises the example five second time interval between marking 414 corresponding to scroll forward ten seconds and marking 414 corresponding to scroll forward fifteen seconds. The application extracts representative content from the media content that is represented on coarse control 402. Particularly, the application extracts representative content from fine interval 418 in the media content. As an example, the representative content may be thumbnails, graphics, images, audio snippets, or a combination thereof, that are found in the media content during fine interval 418.

The application presents such representative content in blocks 416. For example, if fine interval 418 were five seconds, as shown, and the application extracted four thumbnails from that five second period in the media content, the application presents the four thumbnails in blocks 416, giving the user an average fine scrolling granularity of 1.25 seconds (5 seconds/4 thumbnails).

Blocks 416 form the second-stage of fine control 408, making fine control 408 a two-stage fine control. The user can position finger 406 at any of the thumbnails in blocks 416 to reach a precise location in the media content up to an accuracy of the example 1.25 seconds. The application presents other blocks similar to blocks 416 adjacent to other markings 414 in a similar manner.

With reference to FIG. 4B, this figure depicts a block diagram of an example fine control of media presentation progress in accordance with an illustrative embodiment. Line or bar 410 is the same as line 410 in FIG. 4A. Finger 406 is the same as finger 406 in FIG. 4A.

According to one embodiment, the application combines the scroll forward and scroll back operations in a single fine control. For example, moving finger 406 from position A to position B in counter-clockwise direction, as indicated by arrow 422, achieves the scroll forward operation in fine increments. Moving finger 406 from position A to position C in clockwise direction, as indicated by arrow 424, achieves the scroll back operation in fine increments.

Figure 5B:
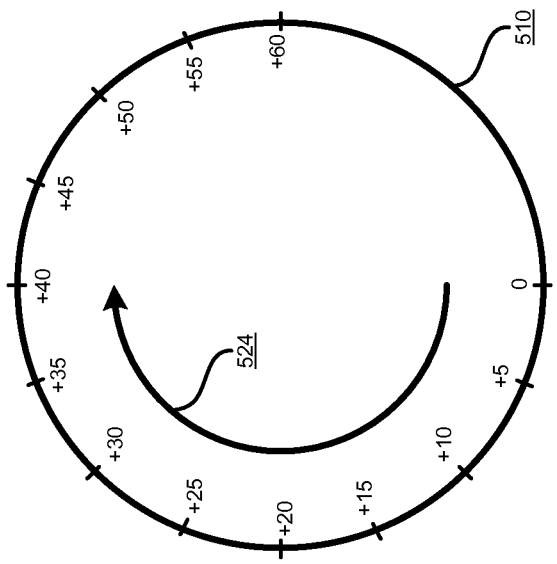
FIG. 5B depicts a block diagram of another example fine control of media presentation progress in accordance with an illustrative embodiment.
Figure 5A:
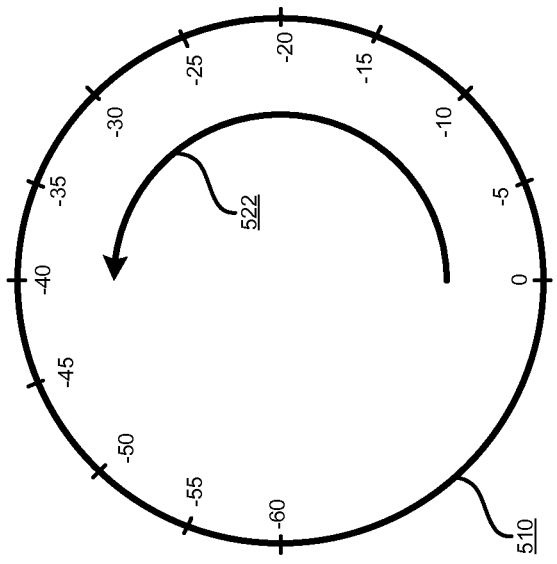
FIG. 5A depicts a block diagram of another example fine control of media presentation progress in accordance with an illustrative embodiment.

With reference to FIG. 5A, this figure depicts a block diagram of another example fine control of media presentation progress in accordance with an illustrative embodiment. Line or bar 510 is an example of line 410 in FIG. 4B.

According to one embodiment, the application presents only scroll back operations in a fine control. For example, moving finger 406 in a counter-clockwise direction, as indicated by arrow 522, achieves the scroll back operation in fine increments. Instead of moving continuously along line 510, the user can reposition finger 406 at any of the markings or a position between markings to achieve a scroll back operation in the corresponding fine increments or a portion thereof.

With reference to FIG. 5B, this figure depicts a block diagram of another example fine control of media presentation progress in accordance with an illustrative embodiment. Line or bar 510 is an example of line 410 in FIG. 4B.

According to one embodiment, the application presents only scroll forward operations in a fine control. For example, moving finger 406 in a clockwise direction, as indicated by arrow 524, achieves the scroll forward operation in fine increments. Instead of moving continuously along line 510, the user can reposition finger 406 at any of the markings or a position between markings to achieve a scroll forward operation in the corresponding fine increments or a portion thereof.

Figure 6:
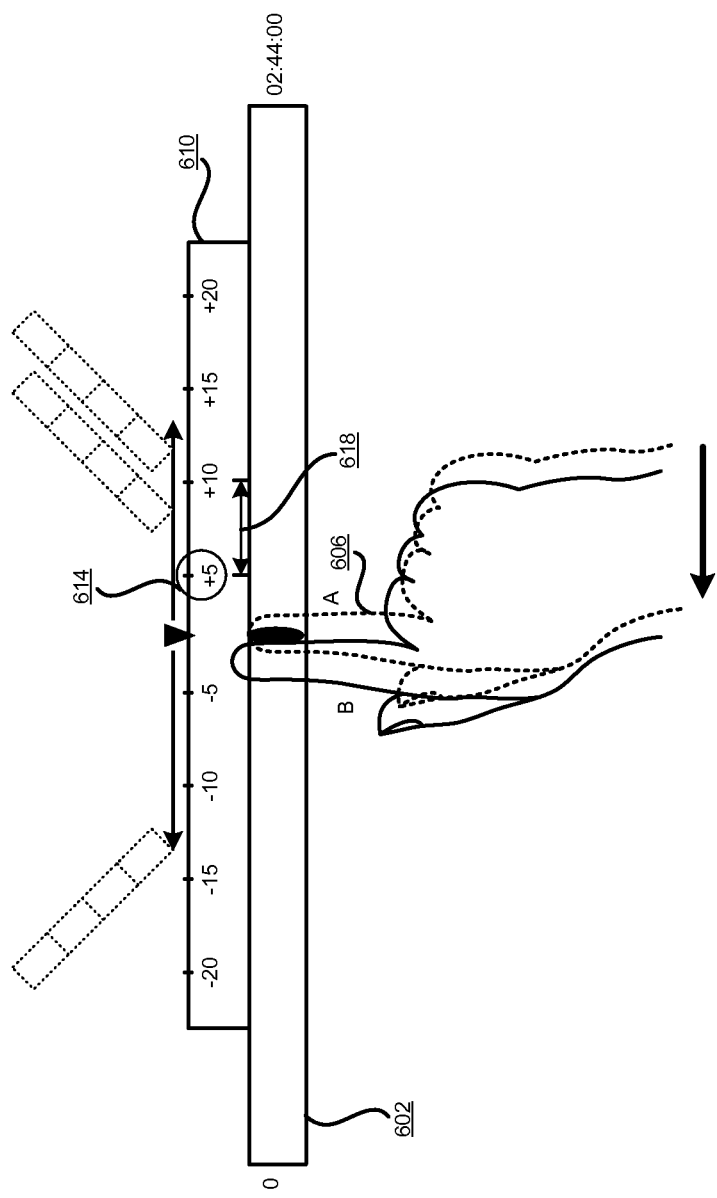
FIG. 6 depicts a block diagram of another example fine control of media presentation progress in accordance with an illustrative embodiment.

With reference to FIG. 6, this figure depicts a block diagram of another example fine control of media presentation progress in accordance with an illustrative embodiment. Finger 606 is an example of finger 406 in FIG. 4A. Bar 610 is an example of line 410 in FIG. 4A. Markings 614 represent a similar concept at markings 414 in FIG. 4A. Blocks 616 and fine interval 618 represent similar concepts as blocks 416 and fine interval 418, respectively, in FIG. 4A.

According to one embodiment, the application presents a linear fine control in the form of bar 610. When the user provides a touch-based input, such as by positioning finger 606 at position A or moving finger 606 from position A to position B, an application implementing an embodiment, such as application 136 in FIG. 1, performs a calculation described elsewhere in the disclosure, and causes bar 610 with markings 614 to appear as a single-stage fine control.

According to one embodiment, the application presents a linear two-stage fine control in the form of bar 610. When the user provides a touch-based input, an application implementing an embodiment, such as application 136 in FIG. 1, performs one or more calculations and extraction operations described elsewhere in the disclosure, and causes bar 610 and blocks 616 to appear as a two-stage fine control.

With reference to FIG. 7A, this figure depicts a block diagram of another example fine control of media presentation progress in accordance with an illustrative embodiment. Finger 706 is an example of finger 606 in FIG. 6. Arc 710 is an example of bar 610 in FIG. 6. Markings 714 represent a similar concept at markings 614 in FIG. 6. Blocks 716 and fine interval 718 represent similar concepts as blocks 616 and fine interval 618, respectively, in FIG. 6.

According to one embodiment, the application presents a fine control in the form of arc 710. When the user provides a touch-based input, such as by positioning finger 706 at position A, an application implementing an embodiment, such as application 136 in FIG. 1, performs a calculation described elsewhere in the disclosure, and causes arc 710 with markings 714 to appear as a single-stage fine control. The user moves finger 706 to position B, or repositions finger 706 to position B for performing a scrolling operation using the fine intervals. As shown, providing a touch-based input at position B performs a scroll back of ten seconds into the media content that is two hours and forty four minutes long, and where a coarse granularity of bar 702 is insufficient to reach portions of the media content with such precision of a few seconds.

According to one embodiment, the application presents an arced two-stage fine control in the form of arc 710. When the user provides a touch-based input, an application implementing an embodiment, such as application 136 in FIG. 1, performs one or more calculations and extraction operations described elsewhere in the disclosure, and causes arc 710 and blocks 716 to appear as a two-stage fine control. Blocks 716 represent a finer granularity into fine interval 718. Other blocks 716 operate in a similar manner. For example, by providing a touch-based input with finger 706 at position C, the user can select the third thumbnail between five and ten seconds of scroll back, to wit, reach content at approximately 8.75 seconds in the past from the current position of the playback.

Figure 7B:
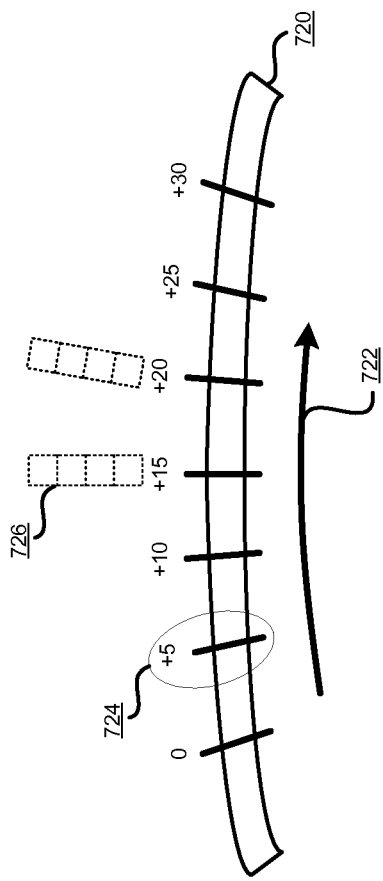
FIG. 7B depicts a block diagram of another example fine control of media presentation progress in accordance with an illustrative embodiment.

With reference to FIG. 7B, this figure depicts a block diagram of another example fine control of media presentation progress in accordance with an illustrative embodiment. Arc 720 is an example of bar 710 in FIG. 7A. Markings 724 represent a similar concept at markings 714 in FIG. 7A. Blocks 726 represent similar concept as blocks 716 in FIG. 7A.

According to one embodiment, the application presents only scroll forward operations in a fine control. For example, providing a touch-based gesture in a clockwise direction, as indicated by arrow 722, achieves the scroll forward operation in fine increments. Instead of moving continuously along arc 720, the user can reposition the finger at any of markings 724 or a position between markings 724 to achieve a scroll forward operation in the corresponding fine increments or a portion thereof. Furthermore, the user can make a touch-based input at any of blocks 726 to further scroll within a fine interval in finer increment than the fine increment of the markings.

Figure 7C:
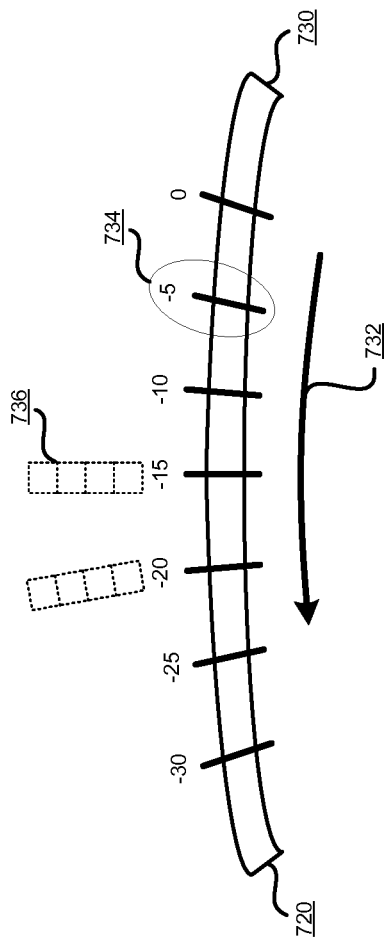
FIG. 7C depicts a block diagram of another example fine control of media presentation progress in accordance with an illustrative embodiment.

With reference to FIG. 7C, this figure depicts a block diagram of another example fine control of media presentation progress in accordance with an illustrative embodiment. Arc 730 is an example of bar 720 in FIG. 7B. Markings 734 represent a similar concept at markings 724 in FIG. 7B. Blocks 736 represent similar concept as blocks 726 in FIG. 7B.

According to one embodiment, the application presents only scroll back operations in a fine control. For example, providing a touch-based gesture in a clockwise direction, as indicated by arrow 732, achieves the scroll back operation in fine increments. Instead of moving continuously along arc 730, the user can reposition the finger at any of markings 734 or a position between markings 734 to achieve a scroll back operation in the corresponding fine increments or a portion thereof. Furthermore, the user can make a touch-based input at any of blocks 736 to further scroll within a fine interval in finer increment than the fine increment of the markings.

With reference to FIG. 8, this figure depicts a flowchart of an example process for fine control of media presentation progress in accordance with an illustrative embodiment. Process 800 can be implemented in application 136 or application 119 in FIG. 1.

The application detects an input at a progress bar, such as at coarse control 702 in FIG. 7A (block 802). The application determines a coarse control scale, to wit, a coarse increment or an equivalent thereof, used for scrolling using the progress bar (block 804).

The application computes a span and increments of a fine control (block 806). For example, the application uses a coarse increment, a timeline, a finger width, an available display area, or a combination of one or more of these and other factors to compute the size of the fine control and the fine increments.

The application constructs the fine control for the progress bar according to the span and increments computed in block 806 (block 808). In one embodiment, the fine control is presented as an overlaid graphical artifact on the progress bar. In another embodiment, the fine control is displayed separately from, and in addition to the progress bar. The application overlays the progress bar with the fine control, or presents the fine control proximate to the progress bar (block 810).

The application receives an input at the fine control (block 812). The application advances or rewinds, to wit, scrolls forward or scrolls back, respectively, the media presentation according to the fine increment corresponding to the input of block 812 (block 814). The application ends process 800 thereafter.

Figure 9:
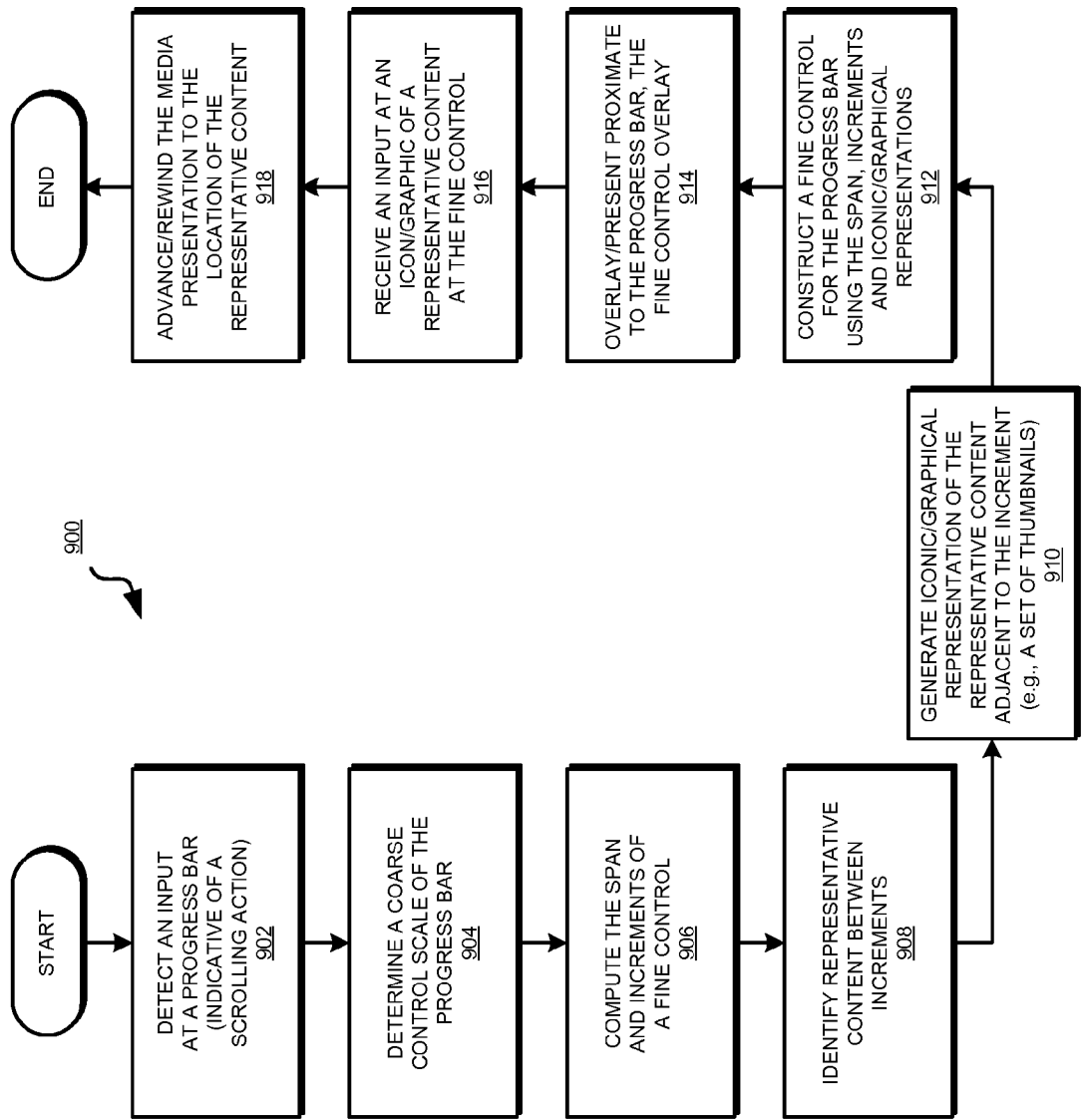
FIG. 9 depicts a flowchart of an example process for fine control of media presentation progress in accordance with an illustrative embodiment.

With reference to FIG. 9, this figure depicts a flowchart of an example process for fine control of media presentation progress in accordance with an illustrative embodiment. Process 900 can be implemented in application 136 or application 119 in FIG. 1.

The application detects an input at a progress bar, such as at coarse control 702 in FIG. 7A (block 902). The application determines a coarse control scale, to wit, a coarse increment or an equivalent thereof, used for scrolling using the progress bar (block 904).

The application computes a span and increments of a fine control (block 906). For example, the application uses a coarse increment, a timeline, a finger width, an available display area, or a combination of one or more of these and other factors to compute the size of the fine control and the fine increments.

The application identifies representative content between the fine increments (block 908). The application generates iconic or graphical representation of the representative content, and positions the iconic or graphical representation adjacent to their respective fine increment markings on the fine control (block 910).

The application constructs the fine control for the progress bar using the span and increments computed in block 906 and the iconic or graphical representations generated in block 910 (block 912). In one embodiment, the fine control is presented as an overlaid graphical artifact on the progress bar. In another embodiment, the fine control is displayed separately from, and in addition to the progress bar. The application overlays the progress bar with the fine control, or presents the fine control proximate to the progress bar (block 914).

The application receives an input at an iconic or graphic representation of a representative content at the fine control (block 916). The application advances or rewinds, to wit, scrolls forward or scrolls back, respectively, the media presentation to the location of the representative content corresponding to the input of block 916 (block 918). The application ends process 900 thereafter.

Thus, a computer implemented method, system or apparatus, and computer program product are provided in the illustrative embodiments for fine control of media presentation progress.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for controlling media content playback, the method comprising:
   presenting, in a touch-based device presenting the media content playback, a first control for controlling playback of the media content;
   presenting a marker on the first control that indicates a current playback position of the media content;
   determining a first increment of the first control, the first control allowing a user to move forward or back in the media content in steps of the first increment using a touch-based gesture received on the marker presented on the first control;
   detecting a touch-based gesture generated by an input element on the marker presented on the first control;
   determining a width of an area covered by the input element used to generate the touch-based gesture;
   computing, dynamically in response to detecting the touch-based gesture, a size of a second control for controlling playback of the media content in steps of a second increment and an amount of playback time represented by the second increment as a function of the first increment and the determined width such that the amount of playback time represented by the second increment is less than an amount of playback time represented by the first increment;
   generating the second control according to the second increment and the size of the second control, the second control allowing the user to move forward or back in the media content in steps of the second increment;
   presenting on the media content playback, the second control proximate to the marker presented on the first control; and
   moving, responsive to the user using the second control, one of (i) forward and (ii) back in the media content as a function of the second increment.

2. The method of claim 1, further comprising:
   extracting, from an interval equal to the second increment, a set of representative content;
   representing each representative content in the set with a graphical representation, forming a corresponding set of graphical representations; and
   associating the set of graphical representations with the second control.

3. The method of claim 2, further comprising:
   positioning the set of graphical representations proximate to a location on the second control, wherein the location represents a the multiple of the second increment; and
   moving in the media content by an additional fraction one of (i) before and (ii) after the multiple of the second increment.

4. The method of claim 3, further comprising:
   receiving a second touch-based gesture at a member graphical representation in the set of graphical representations, wherein the moving by the additional fraction is responsive to the second touch-based gesture.

5. The method of claim 1, wherein the first control further indicates an elapsed time portion and a remaining time portion of a timeline of the media content playback, wherein the moving is by an interval comprising a sum of a multiple of the first increments and the multiple of the second increment in one of (i) the elapsed time portion and (ii) the remaining time portion.

6. The method of claim 1, further comprising:
   configuring the second control such that a second distance in a second touch-based gesture to move in the media content by the second increment is greater than a first distance in a first touch-based gesture at the first control to move in the media content by the second increment.

7. The method of claim 1, further comprising:
   configuring the second control such that a moving in the media content by the second increment becomes possible wherein the first control allows moving in the media content minimum by the first increment.

8. The method of claim 1, further comprising:
   measuring a size of an implement used to make the touch-based gesture;
   determining that the size of the implement is greater than the first increment such that the size of the implement spans multiple first increments on the first control; and
   configuring the size of the second control such that the implement can span a maximum of one span of a second increment.

9. The method of claim 1, wherein the size of the second control is further dynamically determined as a function of a size of a display area available to present the second control.

10. The method of claim 1, further comprising:
    receiving a second touch-based gesture at the second control, wherein the second touch-based gesture causes the moving by a multiple of the second increment.

11. The method of claim 1, wherein the multiple of the second increment comprises a fraction of the second increment.

12. The method of claim 1, wherein the first control comprise a linear bar, wherein the second control comprises a circular control, and wherein the second control allows moving in forward and back directions in the media content by the second increment.

13. The method of claim 1, wherein the first control comprise a linear bar, wherein the second control comprises a second linear control.

14. The method of claim 1, wherein the first control comprise a linear bar, wherein the second control comprises an arc-shaped control, and wherein the second control allows moving in only one direction in the media content by the second increment.

15. A computer usable program product comprising a non-transitory computer readable storage device including computer usable code executable by a processor for controlling media content playback, the executable code comprising code to perform:
  presenting, in a touch-based device presenting the media content playback, a first control for controlling playback of the media content;
  presenting a marker on the first control that indicates a current playback position of the media content;
  determining a first increment of the first control, the first control allowing a user to move forward or back in the media content in steps of the first increment using a touch-based gesture received on the marker presented on the first control;
  detecting a touch-based gesture generated by an input element on the marker presented on the first control;
  determining a width of an area covered by the input element used to generate the touch-based gesture;
  computing, dynamically in response to detecting the touch-based gesture, a size of a second control for controlling playback of the media content in steps of a second increment and an amount of playback time represented by the second increment as a function of the first increment and the determined width such that the amount of playback time represented by the second increment is less than an amount of playback time represented by the first increment;
  generating the second control according to the second increment and the size of the second control, the second control allowing the user to move forward or back in the media content in steps of the second increment;
  presenting on the media content playback, the second control proximate to the marker presented on the first control; and
  moving, responsive to the user using the second control, one of (i) forward and (ii) back in the media content as a function of the second increment.

16. The computer usable program product of claim 15, the executable code further configured to perform:
  extracting, from an interval equal to the second increment, a set of representative content;
  representing each representative content in the set with a graphical representation, forming a corresponding set of graphical representations; and
  associating the set of graphical representations with the second control.

17. The computer usable program product of claim 16, the executable code further configured to perform:
  positioning the set of graphical representations proximate to a location on the second control, wherein the location represents a the multiple of the second increment; and
  moving in the media content by an additional fraction one of (i) before and (ii) after the multiple of the second increment.

18. The computer usable program product of claim 15, wherein the computer usable code is stored in a computer readable storage medium in a data processing system, and wherein the computer usable code is transferred over a network from a remote data processing system.

19. The computer usable program product of claim 15, wherein the computer usable code is stored in a computer readable storage medium in a server data processing system, and wherein the computer usable code is downloaded over a network to a remote data processing system for use in a computer readable storage medium associated with the remote data processing system.

20. A data processing system for controlling media content playback, the data processing system comprising:
  a storage device including a storage medium, wherein the storage device stores computer usable program code; and
  a processor, wherein the processor executes the computer usable program code, and wherein the computer usable program code comprises:
    computer usable code for presenting, in a touch-based device presenting the media content playback, a first control for controlling playback of the media content;
    computer usable code for presenting a marker on the first control that indicates a current playback position of the media content;
    computer usable code for determining a first increment of the first control, the first control allowing a user to move forward or back in the media content in steps of the first increment using a touch-based gesture received on the marker presented on the first control;
    computer usable code for detecting a touch-based gesture generated by an input element on the marker presented on the first control;
    computer usable code for determining a width of an area covered by the input element used to generate the touch-based gesture;
    computer usable code for computing, dynamically in response to detecting the touch-based gesture, a size of a second control for controlling playback of the media content in steps of a second increment and an amount of playback time represented by the second increment as a function of the first increment and the determined width such that the amount of playback time represented by the second increment is less than an amount of playback time represented by the first increment;
    computer usable code for generating the second control according to the second increment and the size of the second control, the second control allowing the user to move forward or back in the media content in steps of the second increment;
    computer usable code for presenting on the media content playback, the second control proximate to the marker presented on the first control; and
    computer usable code for moving, responsive to the user using the second control, one of (i) forward and (ii) back in the media content as a function of the second increment.

* * * * *